United States Patent
Lee

(10) Patent No.: US 7,374,015 B2
(45) Date of Patent: May 20, 2008

(54) MOTOR-DRIVEN POWER STEERING SYSTEM

(75) Inventor: Sun-Mok Lee, Busan Metropolitan (KR)

(73) Assignee: Hyundai Motor Company, Seoul (KR)

( * ) Notice: Subject to any disclaimer, the term of this patent is extended or adjusted under 35 U.S.C. 154(b) by 362 days.

(21) Appl. No.: 11/125,788

(22) Filed: May 10, 2005

(65) Prior Publication Data

US 2005/0247512 A1    Nov. 10, 2005

(30) Foreign Application Priority Data

May 10, 2004    (KR) ............... 10-2004-0032621

(51) Int. Cl.
*B62D 5/04* (2006.01)
(52) U.S. Cl. .................... 180/446; 180/440
(58) Field of Classification Search ............ 180/443, 180/444, 446, 440
See application file for complete search history.

(56) References Cited

U.S. PATENT DOCUMENTS

| | | | | |
|---|---|---|---|---|
| 3,576,228 A | * | 4/1971 | Kasselmann | 180/421 |
| 4,518,170 A | * | 5/1985 | Musgrove | 280/93.513 |
| 4,658,927 A | * | 4/1987 | Kanazawa | 180/422 |
| 4,671,372 A | * | 6/1987 | Shimizu | 180/444 |
| 4,828,066 A | * | 5/1989 | Hayashi | 180/446 |
| 4,881,612 A | * | 11/1989 | Yano et al. | 180/405 |
| 5,267,625 A | * | 12/1993 | Shimizu | 180/443 |
| 6,386,310 B2 | * | 5/2002 | Honzek | 180/380 |
| 6,546,322 B2 | * | 4/2003 | Williams | 701/41 |
| 6,585,074 B2 | * | 7/2003 | Katou et al. | 180/428 |
| 6,966,399 B2 | * | 11/2005 | Tanigaki et al. | 180/444 |

FOREIGN PATENT DOCUMENTS

| | | |
|---|---|---|
| CN | 1133580 A | 10/1996 |
| CN | 1293133 | 5/2001 |
| GB | 2 110 173 A | 6/1983 |

\* cited by examiner

*Primary Examiner*—Kevin Hurley
(74) *Attorney, Agent, or Firm*—Morgan Lewis & Bockius LLP

(57) ABSTRACT

A motor-driven power steering system includes a steering column connected to a steering wheel, a motor with a rotation shaft connected to the steering column, a decelerator that rotates by interacting with the rotation shaft, fixing parts mounted at each left and right wheel, link members rotatably connected at both ends to the fixing parts and the decelerator, a detecting part that detects the vehicle state, and a motor driving device that generates a steering assist force by supplying the motor with a current determined on the basis of the vehicle state. This configuration transmits the driving force of the motor directly to vehicle wheels, thereby optimizing the motor function and reducing the vehicle weight by eliminating a rack.

4 Claims, 2 Drawing Sheets

MOTOR-DRIVEN POWER STEERING SYSTEM

CROSS-REFERENCE TO RELATED APPLICATIONS

The present application is based on, and claims priority from, Korean Application Serial Number 10-2004-0032621, filed on May 10, 2004, the disclosure of which is hereby incorporated by reference herein in its entirety.

FIELD OF THE INVENTION

The present invention relates to a power steering system of a vehicle. More particularly, the present invention relates to a motor-driven power steering system, which generates a steering assist force by using a motor.

BACKGROUND OF THE INVENTION

Generally, a power steering system is either hydraulic or motor-driven. In hydraulic power steering systems that employ oil, a power device (e.g., power pump) pumps hydraulic fluid by using engine power and generates hydraulic pressure. The power device then applies the pressure in the direction in which a driver turns the steering wheel, thus aiding the driver's effort in turning the wheels.

The Motor-Driven Power Steering (MDPS) system multiplies the driver's steering force by using an electric motor. The force required to steer a vehicle is inversely proportional to the speed of the vehicle. Therefore, when the vehicle moves at a low speed, the MDPS is designed to deliver a significant amount of current to the motor to increase the steering assist force. When the vehicle moves at a moderate speed, the MDPS delivers a moderate, predetermined amount of current to the motor. However, when the vehicle moves at a high speed, the current is isolated to eliminate current flowing to the motor. Thus, the motor provides no steering assist force to the driver at high speeds.

However, there is a drawback in the conventional motor-driven power steering systems in that a motor to obtain sufficient rack driving force in mid-sized or heavy vehicles is not easily developed or controlled. Furthermore, the steering is executed by the driving force of the motor with a rack and pinion, thereby increasing energy loss.

SUMMARY OF THE INVENTION

The present invention directly transmits the driving force of a vehicle's motor to its wheels. The present invention is a motor-driven power steering system that includes a steering column connected to a steering wheel, a motor with a rotation shaft connected to the steering column, a decelerator that rotates by interacting with the rotation shaft, link members connecting the decelerator to the wheels via fixing parts, a detecting part that detects the vehicle state, and a motor driving means that generates a steering assist force by operating the motor, which is supplied with a current, the amount of which is determined on the basis of the vehicle state.

In one embodiment, the fixing parts are disposed at the front and rear of wheels at the rotation center points of the wheels, and the connecting points of the decelerator and link member are symmetrically positioned.

In another embodiment, while the wheels are aligned in a forward direction, a line connecting the points where the link members are connected to the decelerator are at a predetermined angle with a line that connects the rotation center of the wheels.

In yet another embodiment, the detecting part includes a vehicle speed sensor to detect the vehicle speed, and a steering sensor to detect a steering direction and steering torque.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
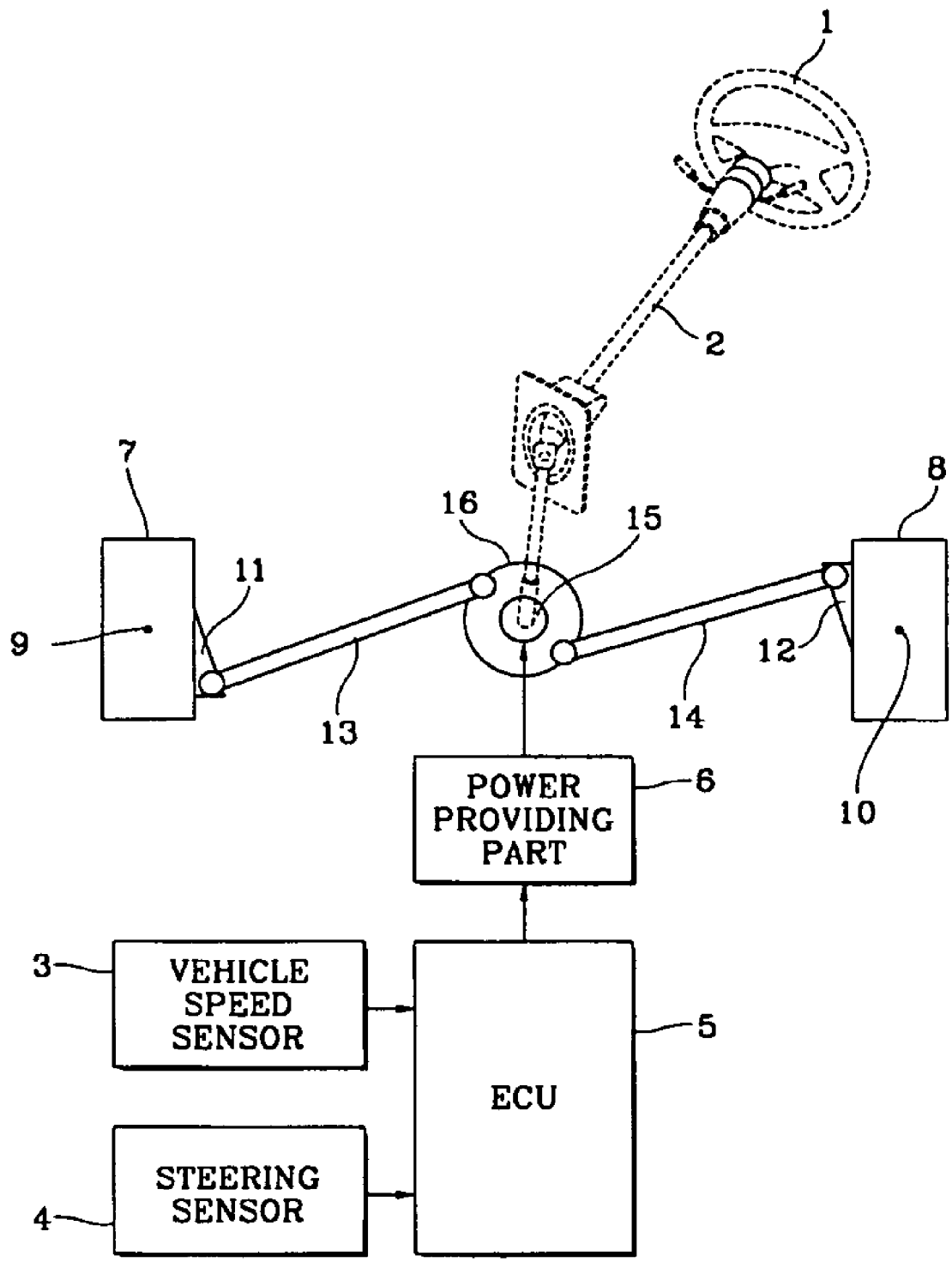
FIG. 1 is a schematic view of a motor-driven power steering system according to an embodiment of the present invention.

Referring now to FIG. 1, the present invention is a motor-driven power steering system that includes steering column 2 connected to steering wheel 1, motor 15 connected at its rotation shaft to steering column 2, decelerator 16 that rotates by interacting with the rotation shaft of motor 15, fixing parts 11 and 12 mounted at left and right wheels 7 and 8, respectively, link members 13 and 14 rotatably connected at both ends to decelerator 16 and each fixing part 11 and 12, detecting parts 3 and 4 that detect the vehicle state, and motor driving means 5 and 6 that generate a steering assist force by operating motor 15, which is supplied with a predetermined amount of current based on the vehicle state detected from detecting parts 3 and 4.

Motor driving means 5 and 6 are Electronic Control Unit (ECU) 5 and power providing part 6. Detecting parts 3 and 4 are vehicle speed sensor 3 and steering sensor 4. ECU 5 receives inputs from vehicle speed sensor 3 and steering sensor 4 to determine the predetermined amount of current to provide to motor 15, and controls power providing part 6 to provide the predetermined amount of current to motor 15.

In one embodiment, fixing parts 11 and 12 are positioned at the rear of a left wheel 7 in relation to a rotation center point 9 and at the front of a right wheel 8 in relation to a rotation center point 10, respectively. Decelerator 16 produces a large torque by decreasing the rotation speed of motor 15, and has circular plate configurations at connecting points with link members 13 and 14. Link members 13 and 14 are symmetrically placed from each other on the diameter of the circular plate.

In another embodiment, fixing part 11 at the rear of left wheel 7 and fixing part 12 at the front of right wheel 8 are rotatably connected to link members 13 and 14, respectively. If wheels 7 and 8 are aligned in the vehicle forward direction, a line that connects points at which link members 13 and 14 are connected onto the circular plate-shaped parts of decelerator 16 forms a predetermined angle against a line that connects rotation center points 9 and 10 of left and right wheels 7 and 8. Thus, the vehicle can turn by effectively pulling the front or rear region of wheels 7 and 8 during the turning of decelerator 16.

When making a left or right turn of steering wheel 1, the driving force of motor 15 is transmitted to wheels 7 and 8 by the following procedure. Steering column 2 rotates in response to the rotation of steering wheel 1. ECU 5 computes a current value by receiving the vehicle speed, steering direction, and steering torque from vehicle speed sensor 3 attached to a speedometer in a clutch and from steering sensor 4 attached to steering column 2. Then, ECU 5 controls power providing part 6 to apply the computed current to motor 15. In this manner, rotation force of motor 15 and the driving force of decelerator 16 connected to motor 15 are controlled.

When decelerator 16 rotates according to the left or right turn of steering wheel 1, link members 13 and 14 shift in accordance to the rotation direction of decelerator 16. Rear left wheel 7 and front right wheel 8 connected to link members 13 and 14 are pushed or pulled, and thus, wheels 7 and 8 point in or out from the straight-ahead position to execute a steering.

Figure 2:
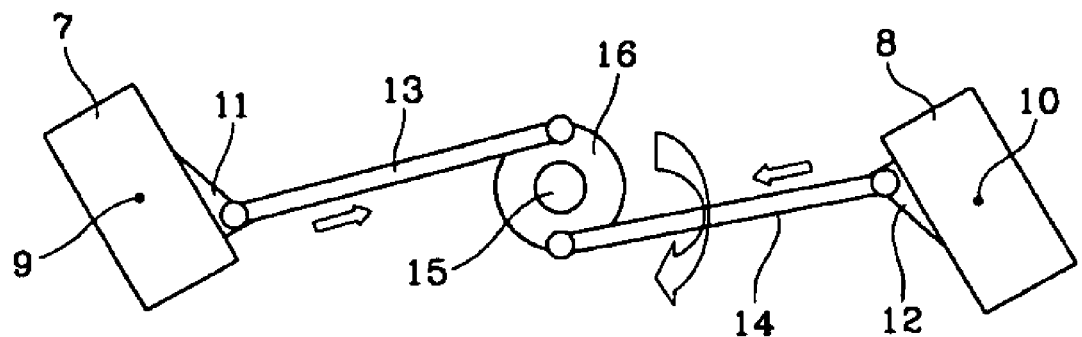
FIG. 2 illustrates an operation state of a motor-driven power steering system when a vehicle makes a left turn according to an embodiment of the present invention.

With reference to FIG. 2, when a driver turns steering wheel 1 to the left, ECU 5 receives the vehicle speed, steering direction, and steering torque as detected by sensor 3 and steering sensor 4 installed in steering column 2. ECU 5 then computes a predetermined current value based on the detected information, and then controls power providing part 6 to apply the computed predetermined current to motor 15 to turn motor 15 to the left. When motor 15 turns to the left, decelerator 16 equipped with a direction conversion gear turns to the right, which causes link members 13 and 14 to turn wheels 7 and 8 turn to the left.

Figure 3:
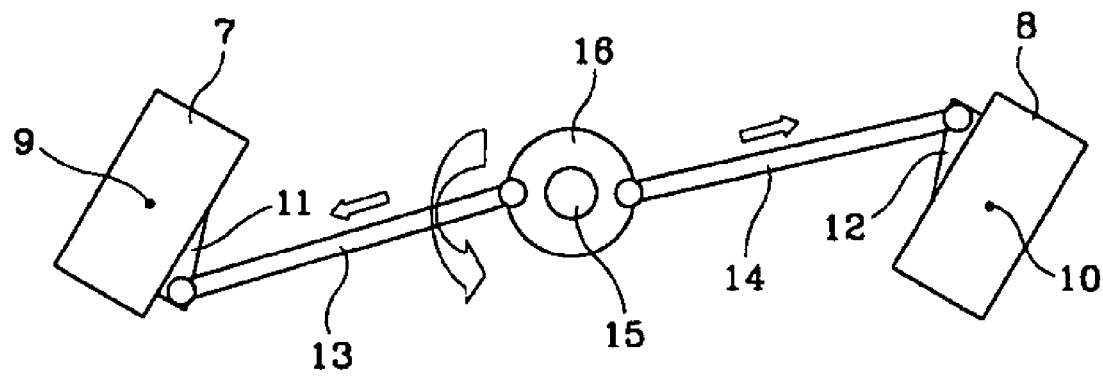
FIG. 3 illustrates an operation state of a motor-driven power steering system when a vehicle makes a right turn according to an embodiment of the present invention.

With reference to FIG. 3, when a driver turns steering wheel 1 to the right, ECU 5 receives the vehicle speed, steering direction, and steering torque as detected by sensor 3 and steering sensor 4 installed in steering column 2. ECU 5 then computes a predetermined current value based on the detected information, and then controls power providing part 6 to apply the computed predetermined current to motor 15 to turn motor 15 to the right. When motor 15 turns to the right, decelerator 16 equipped with a direction conversion gear turns to the left, which causes link members 13 and 14 to turn wheels 7 and 8 turn to the right.

In yet another embodiment of the invention, when wheels 7 and 8 are adjusted in a straight-ahead direction, a line that connects connecting points of decelerator 16 to link members 13 and 14 forms an angle with a line that connects rotation center points 9 and 10 of left and right wheels 7 and 8. However, when steering wheel 1 turns to the left, the line that connects connecting points of decelerator 16 to link members 13 and 14 substantially perpendicular to the line that connects rotation center points 9 and 10 of left and right wheels 7 and 8 (see FIG. 2). If steering wheel 1 is turned to the right, the line that connects connecting points of decelerator 16 to link members 13 and 14 is substantially parallel to the line that connects rotation center points 9 and 10 of left and right wheels 7 and 8 (see FIG. 3).

Since the rotation force generated by motor 15 and decelerator 16 according to the rotational direction of vehicle steering wheel 1 is directly transmitted to wheels 7 and 8, the vehicle's steering is performed without a rack, thereby simplifying the configuration of the steering system. As apparent from the foregoing, there is an advantage in that the driving force generated from the motor in the motor-driven power steering system is directly transmitted to vehicle wheels, resulting in an optimization of the motor function and reduction of the material cost and weight of the vehicle by removing the rack.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A motor-driven power steering system, comprising:
   a steering column connected to a steering wheel;
   a motor with a rotation shaft connected to the steering column;
   a decelerator that rotates by interacting with the rotation shaft;
   a left fixing part mounted at a left wheel;
   a right fixing part mounted at a right wheel;
   a left link member rotatably connecting the decelerator to the left fixing part;
   a right link member rotatably connecting the decelerator to the right fixing part;
   a detecting part for detecting a vehicle state; and
   motor driving means for generating steering assist force by operating the motor, which is supplied with a current determined on the basis of the vehicle state detected from the detecting part;
   wherein one fixing part is disposed at a front of one wheel and the other fixing part is disposed at a rear of the other wheel in relation to rotation center points of the wheels, respectively, and connecting points of the decelerator and link member are symmetrically positioned on the diameter of the decelerator.

2. The system as defined in claim 1, wherein, when the wheels are aligned in a forward direction, the points at which link members and are connected to the decelerator forms line at a predetermined angle against a line that connects rotation center points of the left and right wheels.

3. The system as defined in claim 1, wherein the detecting part includes a vehicle speed sensor for detecting a vehicle speed, and a steering sensor for detecting a steering direction and a steering torque.

4. A motor-driven power steering system, comprising:
   a steering means for steering a vehicle;
   left and right wheels;
   a steering motor with a rotation shaft connecting the steering means and the left and right wheels;
   a decelerator that rotates by interacting with the rotation shaft;
   two fixing parts;
   a link member rotatably connecting the decelerator to one of the fixing parts;
   a detecting means for detecting the vehicle's vehicle state; and
   a motor driving means for receiving the vehicle state, determining a current based on the vehicle state, and applying the current to the steering motor;
   wherein one fixing part is disposed at a front of one wheel and the other fixing part is disposed at a rear of the other wheel in relation to rotation center points of the wheels, respectively, and connecting points of the decelerator and link member are symmetrically positioned on the diameter of the decelerator.

* * * * *